United States Patent [19] … [11] 3,991,223
Baron et al. … [45] Nov. 9, 1976

[54] METHOD FOR TREATING STEAM COFFEE AROMAS

[75] Inventors: R. Michael Baron, Tarrytown, N.Y.; Cirillo Vitti, Hillsdale, N.J.; Slawko Yadlowsky, Manville, N.J.; Robert P. Stolz, Dumont, N.J.

[73] Assignee: General Foods Corporation, White Plains, N.Y.

[22] Filed: May 12, 1972

[21] Appl. No.: 252,759

[52] U.S. Cl. .............................. 426/594; 426/386
[51] Int. Cl.² ........................................... A23F 1/04
[58] Field of Search ................. 99/65, 71, 140 R; 426/386–388, 362, 363, 594

[56] References Cited
UNITED STATES PATENTS

| | | | |
|---|---|---|---|
| 2,947,634 | 8/1960 | Feldman et al. | 99/71 |
| 3,421,901 | 1/1969 | Mahlmann et al. | 99/71 |
| 3,615,665 | 10/1971 | White et al. | 99/71 X |
| 3,810,999 | 5/1974 | Balling et al. | 426/388 X |

*Primary Examiner* — Frank W. Lutter
*Assistant Examiner* — N. Greenblum
*Attorney, Agent, or Firm* — Thomas R. Savoie; Daniel J. Donovan; Bruno P. Struzzi

[57] ABSTRACT

Roasted and ground coffee is contacted with steam and the evolved vapors are condensed and partitioned in two separate and successive operations with liquid glyceride material such as a vegetable oil. By the use of appropriate partitioning parameters both the second glyceride and water phases have been found to have a smooth, buttery flavor useful for enhancing soluble coffee. The second glyceride phase may be combined with natural grinder gas, added to liquid coffee extract and then dried to produce an aromatized soluble coffee product.

4 Claims, No Drawings

METHOD FOR TREATING STEAM COFFEE AROMAS

BACKGROUND OF THE INVENTION

This case is related to commonly-assigned U.S. Pat. No. 3,615,665 and to commonly-assigned U.S. Pat. application Ser. No. 161,327, filed July 9, 1971, now U.S. Pat. No. 3767828, which is a continuation-in-part of the aforementioned patent.

Both the above mentioned patent and application, hereby incorporated by reference, are entitled "Confined Volume Coffee Aroma" and are directed to a method for removing coffee volatiles from roasted and ground coffee by subjecting the coffee to the influence of steam, under pressure, in an isolated column or vessel. The volatiles are taught to be condensed and added to coffee extract or alternatively to be condensed in coffee extract. The extract is then dried. It has been found, however, that this confined volume coffee aroma (CVCA) condensate possesses certain harsh or "green" flavor notes which many coffee consumers find objectionable. It has been desired, therefore, to find techniques for modifying this aroma in order to make it smoother and milder in character.

Natural grinder gas has been identified as one of the most preferred coffee aromas for imparting the aroma of roasted and ground coffee to soluble coffee powders and beverages; however, it has been a problem to both incorporate and stabilize natural grinder gas in soluble coffees. It has, therefore, been sought to find vehicles which will fix significant quantities of grinder gas.

SUMMARY OF THE INVENTION

This invention has identified a procedure for modifying the flavor and aroma of steamed coffee aroma, such as confined volume coffee aroma (CVCA), in order to render this aroma smoother and buttery in character. CVCA may be obtained and condensed according to either the above-mentioned patent or patent application.

According to this invention the steam aroma is modified and improved by subjecting the aqueous condensate to multiple, preferably two, successive extractions with liquid glyceride materials at a volume ratio of condensate to glyceride of at least about 4:1. The first glyceride phase is found to contain many of the harsh green notes and is considered less desirable for the purposes of this invention. The aqueous phase resulting from this first extraction is contacted with a fresh liquid glyceride material, which may or may not be the same type as the first glyceride, preferably at the same volume ratio of condensate to glyceride of at least 4:1. It has additionally been found that the period of contact between the condensate and glyceride should in each instance be at least two to three minutes. This length of time is apparently needed to enable the aromatic compounds present in the aqueous condensate to be absorbed by the glyceride. The contact between the condensate and glyceride should not be merely a static interface but rather agitated contact such as would occur by shaking in a separatory funnel or in a liquid-liquid extraction column.

It has been found preferable to effect each of the two extractions of the steam condensate with the glyceride in such a fashion that at least five equal volume fractions of the total condensate are successively brought into contact with and subsequently successively separated from the liquid glyceride material, the ratio of volume of condensate to volume of glyceride being at least about 4:1 and the length of contact being at least about 2 to 3 minutes.

The twice extracted condensate has been found to be reduced in harsh flavor notes to a sufficient degree that this fraction may advantageously be used to aromatize soluble coffee product such as by adding this condensate to liquid coffee extract and then drying (e.g. freeze drying, spray drying, etc.) the extract. The condensate has been described as having a smooth, buttery character. It has been found that the second glyceride phase possesses a buttery-like character. Consequently this glyceride phase is also useful as a means to aromatize soluble coffee and may be incorporated into the soluble coffee product either by blending the glyceride with coffee extract prior to drying and/or combining the glyceride with soluble coffee, such as by spray plating the liquid glyceride onto the surface of the soluble powder.

This second glyceride phase has also proven useful as a means to fix natural grinder gas aroma, since it has been found that, surprisingly, this already aromatized glyceride is able to fix natural grinder gas at higher levels than comparable unaromatized fresh glycerides. The second glyceride phase supplemented with natural grinder gas may be incorporated into soluble coffee products in the manners described above.

Naturally the aromatized soluble coffee produced in accordance with this invention may constitute the whole or only a portion of a soluble coffee product. It is possible to aromatize a soluble coffee fraction at a relatively high level and to then combine this fraction with a different, usually unaromatized, soluble coffee fraction. Combination of aromatized freeze dried coffee produced according to this invention and agglomerated spray dried coffee have proven useful.

DESCRIPTION OF THE PREFERRED EMBODIMENT

A preferred embodiment of this invention involves heating roasted and ground coffee at a moisture level of less than 40 percent in a confined vessel under pressure. Steam pressure is built up and maintained in the vessel either by introducing steam into the vessel and isolating the vessel at a predetermined pressure or by prewetting the roasted coffee to the desired moisture level, closing the vessel and applying external heat to the isolated vessel. The moisture in the coffee is in intimate contact with the aroma and flavor constituents through the coffee, and when the pressure is relieved by venting, aroma and flavor constituents are carried out of the zone with the escaping vapors. At least a portion of the volatile constituents are recovered in a condenser system.

It has been found that a preferred moisture level for coffee to be treated by the process of this invention is about 1% to 7% by weight of the wetted coffee. According to one embodiment of this invention, coffee, at a desired moisture level, is charged into a pressure vessel wherein it is heated by passing steam through the vessel. The coffee is heated to a temperature of from 240° to 350° F. The steam purges the air in the vessel which is forced out through a vent line. When the temperature of the exiting gases reaches a predetermined temperature, usually below the preferred temperature range for pressure treatment, the vent line is isolated. This preheating step should be achieved within 5 minutes and preferably in 1 to 2 minutes. The heating time can be controlled by using steam at a sufficiently high pressure to achieve the heating in the desired time. The pressure in the vessel is then increased to above atmospheric pressure by continuing the flow of steam into the vessel. When the pressure has been increased to a preselected level of from 10 to 100 p.s.i.g. the vessel is isolated by closing off the flow of steam. The coffee is then maintained at the elevated pressure for a period of from 15 seconds to 10 minutes, preferably 2 to 5 minutes. During this period of time a portion of the water within the coffee is vaporized and displaces volatile constituents within the coffee.

The upper limit of 10 minutes is critical in order to avoid significantly degrading the roasted coffee. Similarly the pressures and temperatures are critical and a preferred range of pressures is from 20 to 50 p.s.i.g. The temperature is maintained at least as high as the temperature of saturated steam at the preselected pressure in order to avoid condensing additional water while the coffee is under pressure.

It has been found that under the aforementioned temperature and pressure conditions the moisture in the coffee is readily equilibrated throughout the coffee so that the moisture can displace, absorb or react with any undesirable volatiles present in the interior portions of said coffee. Obviously, the desirable volatile constituents are also in intimate contact with the equilibrated moisture. The preferred period of contact is from 1 to 4 minutes as compared to an equilibration period of from 1 to 2 hours which is often necessary under atmospheric conditions.

The vent line is then opened and the water vapors and displaced volatile constituents of the coffee flow out of the vessel until the pressure within the vessel is reduced to atmospheric pressure. It is important to size the vent line such that the pressure is relieved in a reasonable period of time, preferably 1 to 2 minutes, and at most 5 minutes. An excessive time in venting will expose the coffee to undesirable additional heat treatment. It is also important to avoid too rapid a release of pressure. If the gases escape too quickly, it will require an impractically large condenser system to trap and condense the volatile flavor and aroma constituents. Also, too sudden a release of pressure will result in something like gun-puffing or an explosion of the coffee, and this is to be avoided. The escaping water vapors and coffee volatiles are passed through a condenser system wherein the volatiles are condensed and collected. For the purpose of this invention, the vessel is considered to have reached atmospheric pressure when a gage at the top of the vessel indicates atmospheric pressure. It is understood that there may be a pressure gradient remaining from top to bottom of the vessel. The process does not require waiting for the pressure throughout the column to reach atmospheric conditions.

As previously indicated a comparable process can be performed by heating a vessel containing coffee and water so as to vaporize the water to first purge the vessel and then to produce and maintain a desired pressure within the isolated vessel.

The confined volume coffee aroma is then condensed in either a single or multiple stage condenser system and the condensate contacted with liquid glyceride material, such as vegetable oil, triacetin, etc., in two separate stages. Generally, for purposes of this invention it will be desirable to work with only a partial condensate, preferably a condensate which does not contain the most volatile compounds, which tend to be the most unstable. Usually those volatiles which condense below −100° F, and preferably below about 30° F, are permitted to escape from the collection system uncondensed. The condensate is preferably collected in the temperature range between about 30° F and 90° F.

The partial condensate is preferably separated into five or more equal fractions and each fraction is successively contacted with a first and second liquid glyceride at a volume ratio of condensate to glyceride of about 4:1. Specifically this may be accomplished by the use of two separatory funnels each containing the appropriate, and preferably equal, amount of liquid glyceride. The first fraction of condensate is placed in first funnel and shaken with the glyceride for a period of at least 2 to 3 minutes. The mixture is then allowed to separate into distinct glyceride and aqueous phases and the aqueous phase which is the original condensate minus aromatics absorbed by the first glyceride, is drawn off and placed in the second separatory funnel where it is shaken with the second glyceride for a period of at least 2 to 3 minutes. The mixture in this second funnel is then allowed to separate into distinct glyceride and aqueous phases and the aqueous phase, which is the first aqueous phase minus additional aromatics absorbed by the second glyceride, is drawn off and stored. This entire procedure is then repeated for each of the four or more remaining condensate fractions using the same funnels containing the increasingly aromatic liquid glycerides. In this manner each of the first and second glycerides comes in contact with about 20 times its own volume of CVCA condensate.

The first and second glyceride materials may be the same or they may differ (e.g. first glyceride is triacetin and the second is cottonseed oil). Since the various glyceride materials will tend to absorb aromatics from the CVCA condensate differently, it will be recognized by those skilled in the art that the exact flavor and aroma of the second aqueous and glyceride phases may be somewhat varied by the choice of materials employed for the first and second glycerides.

It has been found that a volume ratio of CVCA to glyceride of at least about 4 to 1 is desired in order to obtain significant transfer of aromatic constituents from the CVCA condensate to the glyceride. The use of a five fraction partitioning operation has been found desirable in order to maximize the efficiency of the extraction medium (i.e. the glyceride). At overall extraction ratios of CVCA condensate to glyceride of above 20 to 1 little additional transfer of aromatics is found to occur. It has additionally been found, although not completely understood, that the use of five equal fractions of condensate at a 4 to 1 ratio of condensate to glyceride has produced secondary glyceride and aqueous phases that are considered to be more desirable than comparable phases obtained by two successive 20 to 1 extraction operations.

As previously indicated the second glyceride phase has proven useful not only as a means for directly aromatizing soluble coffee products but also as a means to fix grinder gas at higher levels than have heretofore been achieved with the use of fresh glycerides. It has previously been found, as disclosed in commonly-assigned and concurrently-filed U.S. Pat. application, Ser. No. 252,778, now abandoned, entitled, "Enhanced Soluble Foodstuffs and Method for Producing Same", that natural grinder gas may be combined with liquid glyceride materials, such as triacetin, vegetable oils, etc., added to liquid coffee extract and then dried to produce an enhanced soluble coffee.

Grinder gas may be condensed as a frost and blended with the glyceride, absorbed directly into the glyceride or combined in other ways to effect fixation of the grinder gas by the glyceride. It has, however, always been desired to maximize the level of grinder gas fixed in the glyceride in order to both conserve grinder gas resources and to minimize the amount of glyceride added to the soluble coffee product. It has now been found that, by the use of the second glyceride phase obtained from two successive extractions of CVCA condensate as described above, grinder gas fixation can be significantly improved over the use of fresh glyceride fixation mediums as evaluated by both gas chromatograph and organoleptic techniques.

This invention is further illustrated but not limited by the following examples.

EXAMPLE 1

One hundred and five pounds of roasted and ground coffee at a moisture content of 7 percent were charged into a stainless steel insulated column (8 inches diameter by 14 feet) which had been preheated to a temperature of 350° F. Steam at 40 p.s.i.g. was fed into the bottom of the column to heat the coffee and flush out the air through a vent line at the top of the column. After 1½ minutes the gases exiting from the vent line had a temperature of about 240° F and the vent valve was closed. The pressure in the column was raised to 30 p.s.i.g. by continuing to feed steam into the column for about 1 minute. The column was then isolated by closing off the steam line and the coffee was maintained under pressure for 2 minutes. The top vent valve was then opened and the volatile coffee constituents and water vapor allowed to pass into a condenser which was maintained at 45° F with chilling water. The flow of vapors continued for 2 minutes before the pressure in the column was reduced to atmospheric pressure and condensate was collected at a temperature of from 75° F to 65° F as it came out of the condenser.

EXAMPLE 2

1000 ml. of condensate obtained in accordance with Example 1 was split into five 200 ml. portions. A first portion was added to a separatory funnel containing 50 ml. of cottonseed oil. The funnel was vigorously shaken for a period of 3 minutes and then held in a stationary position to enable the aqueous condensate and cottonseed oil to separate into lower and upper layers. The aqueous phase (about 200 ml.) was drawn from this first funnel and added to a second separatory funnel also containing 50 ml. of cottonseed oil. A second extraction and separation procedure was repeated on the once extracted portion of condensate and a second aqueous phase (about 200 ml.) was collected and stored. Each of the remaining four fractions were processed in similar fashion to the first, using the same funnels containing the same 50 ml. of cottonseed oil and the second aqueous phases were combined. The resulting liquids (50 ml. of the first oil phase, 50 ml. of the second oil phase and 1000 ml. of the second aqueous phase) were organoleptically evaluated and characterized by skilled tasters as being harsh, green and rubbery for the first oil phase similar to the original CVCA condensate, high impact, and buttery for the second oil phase and mild, mellow and buttery for the second aqueous phase.

EXAMPLE 3

The second aqueous phase of Example 2 was added to freshly prepared coffee extract (35% solids) at a level of 12% of the aqueous phase by weight of extract solids, and the resulting extract is freeze dried. The soluble coffee thus produced was found to exhibit an enhanced aroma and flavor when reconstituted with hot water.

EXAMPLE 4

The second oil phase of Example 2 was added to freshly prepared coffee extract (28% solids) at a level of 1% of the oil phase by weight of the extract solids, and the extract is spray dried. The soluble coffee thus produced was found to exhibit an enhanced aroma and flavor when reconstituted with hot water.

EXAMPLE 5

The second oil phase of Example 2 was mixed with grinder gas frost at a ratio of 1 ml. of oil to 1 gram of the frost. The grinder gas frost was obtained by condensing on a liquid nitrogen cold finger the gas liberated upon grinding freshly roasted coffee in a Gump grinder. The resulting mixture was analyzed on a gas chromatograph where a total area G.C. count of 7,675,022 was obtained (base count of oil phase alone about 5,000,000). A comparable mixture of grinder gas frost and fresh cottonseed oil produced a total area G.C. count of only 1,016,933 (base count of cottonseed oil alone about zero). Thus the fixation of grinder gas is improved over two-fold by the use of the second oil phase of Example 2 over fresh oil.

EXAMPLE 6

The grinder gas frost — second oil phase mixture of Example 5 is added to liquid coffee extract (35% solids) at a level of 1% of oil by weight of the extract solids, and the extract is freeze dried. The soluble coffee thus produced was found to exhibit an enhanced aroma and flavor when reconstituted with hot water.

Having thus described the invention what is claimed is:

1. A process for modifying and using a steamed coffee aroma comprising the steps of:
    a. placing roasted coffee in a vessel,
    b. isolating the vessel,
    c. contacting the coffee with steam in the isolated vessel for from 15 seconds to 10 minutes at a pressure of from 10 to 100 p.s.i.g.,
    d. cooling the evolved vapors to obtain an aqueous condensate,
    e. collecting the aqueous condensate,
    f. contacting the aqueous condensate with a first liquid glyceride material for a period of at least 2 to 3 minutes,
    g. separating the aqueous condensate from the first glyceride,
    h. contacting the separated aqueous condensate with a second liquid glyceride material for a period of at least 2 to 3 minutes,
    i. separating the aqueous condensate from the second glyceride, and then
    j. incorporating the twice-contacted and separated aqueous condensate in a soluble coffee product,
    k. contacting the second glyceride with natural grinder gas, and then incorporating this glyceride in the soluble coffee product.

2. The product produced in accordance with claim 1.

3. The method of claim 1 wherein the natural grinder gas is in the form of a condensed frost.

4. The method of claim 1 wherein the first and second liquid glyceride materials are different.

* * * * *